United States Patent [19]

Model

[11] 4,012,370
[45] Mar. 15, 1977

[54] MONO ARYL AZO-MONO-IMINOISOINDOLINONE DYESTUFFS

[75] Inventor: Ernst Model, Basel, Switzerland
[73] Assignee: Ciba-Geigy Corporation, Ardsley, N.Y.
[22] Filed: Jan. 7, 1974
[21] Appl. No.: 431,242
[30] Foreign Application Priority Data
Jan. 9, 1973 Switzerland .......................... 223/73
[52] U.S. Cl. ................................ 260/152; 260/165; 260/207; 260/207.1; 106/288 Q
[51] Int. Cl.$^2$ ....................................... C09B 43/00
[58] Field of Search .......................... 260/152, 165

[56] References Cited
UNITED STATES PATENTS

| 2,537,352 | 1/1951 | Jones ............................... 260/326 |
| 3,484,454 | 12/1969 | Pugin et al. ..................... 260/326.1 |
| 3,912,710 | 10/1975 | Model et al. ..................... 260/152 X |

FOREIGN PATENTS OR APPLICATIONS

| 2,154,584 | 5/1973 | France ............................. 260/152 |
| 1,213,993 | 11/1970 | United Kingdom .............. 260/152 |

Primary Examiner—Charles F. Warren
Attorney, Agent, or Firm—Vincent J. Cavalieri

[57] ABSTRACT

Iminoisoindolinone dyestuffs of the formula

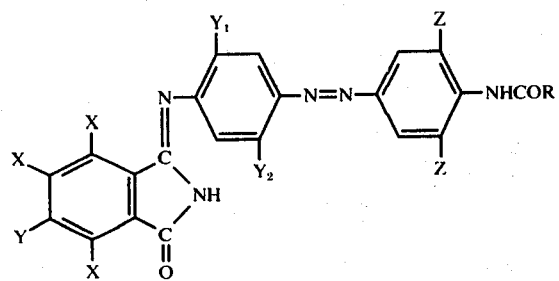

wherein X is halogen, Y halogen, alkoxy, cycloalkoxy, aralkoxy or aryloxy, $Y_1$ hydrogen, halogen, alkyl or alkoxy having 1 – 4 c-atoms, $Y_2$ alkyl, alkoxy or alkanoylamino having 1 – 4 c-atoms or benzoylamino, Z chlorine or methyl and R alkyl having 1 – 4 c-atoms or aryl which are useful for pigmenting high molecular organic material.

2 Claims, No Drawings

MONO ARYL AZO-MONO-IMINOISOINDOLINONE DYESTUFFS

It has been found that new, valuable iminoisoindolinone dyestuffs of the formula

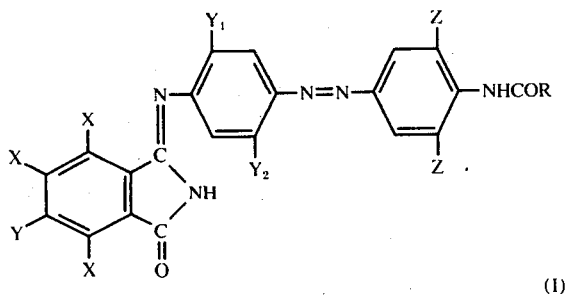

wherein the X denote halogen atoms, especially chlorine atoms, Y denotes a halogen atom or an alkoxy, cycloalkoxy, aralkoxy or aryloxy group, $Y_1$ denotes a hydrogen or halogen atom or an alkyl or alkoxy group containing 1 – 4 carbon atoms, $Y_2$ denotes an alkyl, alkoxy or alkanoylamino group containing 1 – 4 carbon atoms or a benzoylamino group which is optionally substituted, for example by halogen atoms or alkyl or alkoxy groups containing 1 – 4 carbon atoms, the Z denote chlorine atoms or methyl groups and R denotes an alkyl group containing 1 –4 carbon atoms or an aryl radical, preferably a phenyl radical which is optionally substituted by halogen atoms, or alkyl or alkoxy groups containing 1 – 4 carbon atoms, are obtained when a trihalogenoisoindolinone-1 or tetrahalogenoisoindolinone-1, which contains, in the 3-position, one or two easily replaceable substituents which in total require two bonds and are more mobile than the oxygen in the 1-position, is condensed with an amine of the formula

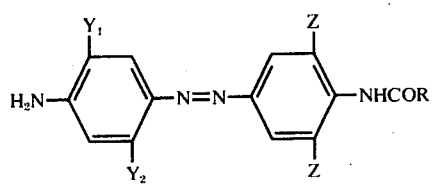

Starting substances used are, for example, 4,5,6,7-tetrabromo-, 4,5,6-trichloro-6-methoxy- and preferably 4,5,6,7-tetrachloro-isoindolinone-1 containing easily replaceable substituents in the 3-position.

As examples of easily replaceable substituents in the 3-position there may be mentioned two halogen atoms, especially chlorine atoms, two secondary amino groups, for example containing 1 to 4 carbon atoms, for example piperidino or morpholino groups, an imino or a thio group or especially two alkoxy groups, for example containing 1 to 4 carbon atoms, especially methoxy groups. These starting substances are known.

The isoindolinones mentioned must be condensed with the amines of the formula (II).

The following amines may be mentioned as examples: 4-amino-2-methyl-3', 5'dichloro-4'-acetylamino-azobenzene, 4-amino-2-methoxy-3',5'-dichloro-4'-acetylamino-azobenzene, 4-amino-2,5-dimethyl-3',5'-dichloro-4'-acetylamino-azobenzene, 4-amino-2-methyl-5-chloro-3',5'-dichloro-4'-acetylaminoazobenzene, 4-amino-2-methyl-5-methoxy-3',5'-dichloro-4'-acetylamino-azobenzene, 4-amino-2-methoxy-5-methyl-3',5'-dichloro-4'-acetylamino-azobenzene, 4-amino-2,5-dimethoxy-3',5'-dichloro-4'-acetylamino-azobenzene, 4-amino-2-acetylamino-3',5'-dichloro-4'-acetylamino-azobenzene, 4-amino-5-chloro-2-acetylamino-3',5'dichloro-4'-acetylamino-azobenzene, 4-amino-5-methyl-2-acetylamino-3',5'-dichloro-4'-acetylamino-azobenzene, 4-amino-5-methoxy-2-acetylamino-3',5'-dichloro-4'-acetylamino-azobenzene, 4-amino-2-propionylamino-3',5'-dichloro-4'-acetylamino-azobenzene, 4-amino-5-methyl-2-propionylamino-3',5'-dichloro-4'-acetylamino-azobenzene, 4-amino-5-methyl-2-butyrylamino-3',5'-dichloro-4'-acetylamino-azobenzene, 4-amino-2-benzoylamino-3',5'-dichloro-4'-acetylamino-azobenzene, 4-amino-2-benzoylamino-3',5'-dimethyl-4'-acetylamino-azobenzene, 4-amino-2-methoxy-3',5'-dimethyl-4'-acetylamino-azobenzene, 4-amino-2,5-3',-5'-tetramethyl-4'-acetylamino-azobenzene, 4-amino-5-chloro-2,3',5'trimethyl-4'-acetylamino-azobenzene, 4-amino-2-3',5'-trimethyl-5-methoxy-4'-acetylamino-azobenzene, 4-amino-2,5-dimethoxy-3',5'-dimethyl-4'-acetylamino-azobenzene, 4-amino-2-4'-diacetylamino-3',5'-dimethyl-azobenzene, 4-amino-5-chloro-2,4'-diacetylamino-3',5'-dimethyl-azobenzene, 4-amino-3',5-5'-trimethyl-2,4'-diacetylamino-azobenzene, 4-amino-5-methoxy-2,4'-diacetylamino-3',5'-dimethyl-azobenzene, 4-amino-2,-4'-dipropionylamino-3',5'-dimethyl-azobenzene, 4-amino-3',5'-trimethyl-2-4'-dipropionylamino-azobenzene, 4-amino-2-3',5'-trimethyl-4'-benzoylamino-azobenzene, 4-amino-2-,3',5'-trimethyl-4'-p-chlorobenzoylamino-azobenzene, 4-amino-2-,3',5'-trimethyl-4'-p-methylbenzoylamino-azobenzene and 4-amino-2-,3',5'-trimethyl-4'-p-methoxybenzoylaminoazobenzene.

The condensation of the trihalogenoisoindolinone or tetrahalogenoisoindolinone with the aminoazobenzene is in some cases carried out in the cold but if necessary with warming of the intimately mixed components, and particularly advantageously in the presence of inert organic solvents, that is to say solvents which do not participate in the reaction.

If starting from 3-imino-, 3-thio- or 3,3-bis-sec. amino-4,5,6,7-tetrachloroisoindolin-1-ones or from alkali metal salts of 3,3-dialkoxy-4,5,6,7-tetrachloroisolindolin1-ones, water-miscible organic solvents are advantageously used, for example lower aliphatic alcohols, such as lower alkanols, for example methanol, isopropanol or butanol, lower cyclic ethers, such as dioxane, ethylene glycol monomethyl ether or lower aliphatic ketones, such as acetone. The condensation in these cases takes place even at relatively low temperatures. It is advantageously carried out in the presence of agents which bind bases; as examples of such agents there may be mentioned lower fatty acids which then simultaneously serve as solvents, especially acetic acid.

When using 3,3-dihalogenoindolin-1-ones, organic solvents free of hydroxyl groups are preferred, such as hydrocarbons, for example aromatic hydrocarbons, such as benzene, toluene, xylene, tetrahdronaphthalene or diphenyl, or cycloaliphatic hydrocarbons, for example cyclohexane, but also halogenated hydrocarbons, such as aliphatic halogenated hydrocarbons, for example caron tetrachloride or tetrachlorethylene, or aromatic halogenated hydrocarbons, such as chlorobenzene or dichlorobenzenes and trichlorobenzenes, and also aromatic nitro-hydrocarbons, such as nitrobenzenes, ethers, in particular aliphatic ethers, such as dibutyl ether, aromatic ethers, such as diphenyl ether, or cyclic ethers, such as dioxane, ketones, such as acetone, or esters, especially esters of lower fatty acids with lower alkanols, such as ethyl acetate, in the presence of acid-binding agents.

The new pigment precipitates from the reaction medium immediately after its formation. For certain purposes, it can be used directly as crude pigment; however, it can also be improved further in its properties, especially with regard to purity, form and hiding power, in accordance with methods which are in themselves known, for example by extraction with organic solvents or by grinding with grinding auxiliaries which can subsequently be removed again, for example salts.

The new dyestuffs are valuable pigments which can be used, in a finely divided form, for pigmenting high molecular organic material for example cellulose ethers and cellulose esters, such as ethylcellulose, acetylcellulose and nitrocellulose, polyamides or polyurethanes or polyesters, natural resins or synthetic resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, thermoplastic or thermosetting acrylic resins, rubber, casein, silicone and silicone resins, individually or as mixtures. It is immaterial whether the high molecular compounds mentioned are in the form of plastic masses or melts or in the form of spinning solutions, lacquers or printing inks. Depending on the end use it proves advantageous to use the new pigments as toners or in the form of preparations. The great depth of colour, and the excellent fastness to migration and overlacquering, are particularly surprising in view of the fact that the dyestuffs only contain one isoindolinone group in the molecule.

EXAMPLE 1

A hot solution of 12.6 g of 4-amino-3-acetylamino3',5'-dichloro-4'-acetylamino-azobenzene in 200 ccs of odichlorobenzene is added to a solution of 11.7 g of 3,3,4,5,6,7-hexachloroisoindoline in 100 ml of o-dichlorobenzene. A yellow precipitate forms immediately. The suspension is heated to 160°–170° C whilst stirring and is kept thereat for 2 hours.

The insoluble pigment is filtered off at 130° and washed with methanol and water. After drying, 14.8 g of a yellow powder are obtained, which can be used directly in this form for colouring plastics. The yellow colourations thereby produced are distinguished by good fastness to migration and to light.

EXAMPLE 2

12.2 g of 4,5,6,7-tetrachloro-3,3-dimethoxy-isoindolin-1-one are dissolved in methanol by means of 36.7 ml of 1 N sodium methylate solution. 11.6 g of 4-amino-2-methoxy-3',5'dichloro-4'-acetylamino-azobenzene are now added and the mixture is heated to the boil for 1 hour. After addition of 100 ml of 1,2-dichlorobenzene, the temperature is raised to 100° whilst distilling off methanol. The Na salt of the pigment separates out. After addition of a further 100 ml of 1,2-dichlorobenzene and 14 ml of glacial acetic acid, the temperature is raised to 140°–145° and the mixture is stirred at this temperature for 2 hours. The pigment which has precipitated is filtered off at 120°, washed with methanol and water and dried in vacuo at 70°. 13.7 g of a reddish-tinged yellow pigment are obtained which, when incorporated into lacquers, gives colourations of very good fastness to light and to weathering.

EXAMPLE 3

11 g of 3,4,5,6-tetrachloro-2-cyanobenzoic acid methyl ester are stirred with 36.7 ml of a 1 N sodium methylate solution in methanol to give a clear solution. the sodium salt of 3,3-dimethoxy-4,5,6,7-tetrachloroisoindolin-1-one is produced. 11.4 g of 4-amino-2,5-dimethoxy-3',5 -dimethyl-4'acetylamino-azobenzene are now rinsed in with the aid of a little methanol, whilst stirring well, and 100 ml of o-dichlorobenzene are added. The temperature is now raised to 100° whilst methanol distils off. The sodium salt of the pigment separates out. the mixture is diluted with a further 100 ml of o-dichlorobenzene and acidified with 14 ml of glacial acetic acid, the temperature is raised to 140° and the mixture is stirred well for 2 hours. The insoluble pigment is filtered off at 120° and washed with methanol and water. After drying, 16 g of a strongly coloured orange pigment are obtained, which can be used directly in this form for colouring plastics and for the manufacture of printing pastes and coloured lacquers. The colorations produced therewith are distinguished by outstanding fastness properties.

EXAMPLES 4–5

If instead of 3,4,5,6-tetrachlorocyanobenzoic acid methyl ester equimolecular amounts of 3,4,5,6-tetrabromo-2-cyanobenzoic acid methyl ester (melting point 122°–124°) or 5-methoxy-3,4,6-trichloro-2-cyanobenzoic acid methyl ester are used and the procedure indicated is followed, orange pigments are obtained which when incorporated into lacquers give colourations of excellent fastness properties.

EXAMPLES 6–20

The table which follows describes the manufacture of further dyestuffs which are obtained when, following the instructions of Example 3, 3,4,5,6-tetrachlorocyanobenzoic acid methyl ester is condensed with the aminoazobenzenes indicated in Column II. Column III indicates the shade of the dyestuffs obtained.

| No. | Aminoazobenzene | Shade |
| --- | --- | --- |
| 6 | 4-Amino-2-3',5'-trimethyl-4'-acetylamino-azobenzene | yellow |
| 7 | 4-Amino-2,4'-di-(acetylamino)-3',5'-dimethyl-azobenzene | yellow |
| 8 | 4-Amino-2-3',5'-trimethyl-4'-p-chlorobenzoyl-azobenzene | yellow |
| 9 | 4-Amino-2-methoxy-3',5'-dimethyl-4'-p-chlorobenzoyl-azobenzene | reddish-tinged yellow |
| 10 | 4-Amino-2,5-dimethoxy-3',5'-dimethyl-4'-p-chlorobenzoyl-azobenzene | reddish-tinged yellow |
| 11 | 4-Amino-2-acetylamino-3',5'-dimethyl-4'-p-chlorobenzoyl-azobenzene | yellow |
| 12 | 4-Amino-2-methyl-3',5'-dichloro-4'-acetylamino-azobenzene | reddish-tinged yellow |
| 13 | 4-Amino-2-methoxy-3',5'-dichloro-4'-acetylamino-azobenzene | reddish-tinged yellow |

-continued

| No. | Aminoazobenzene | Shade |
|---|---|---|
| 14 | 4-Amino-2,5-dimethoxy-3',5'-dichloro-4'-acetylamino-azobenzene | reddish-tinged yellow |
| 15 | 4-Amino-2,4'-di-(acetylamino)-3',5'-dichloro-azobenzene | yellow |
| 16 | 4-Amino-2-p-chlorobenzoylamino-3',5'-dichloro-4'-acetylamino-azobenzene | yellow |
| 17 | 4-Amino-2-methyl-3',5'-dichloro-4'-p-chlorobenzoylamino-azobenzene | reddish-tinged yellow |
| 18 | 4-Amino-2-methoxy-3',5'-dichloro-4'-p-chlorobenzoylamino-azobenzene | reddish-tinged yellow |
| 19 | 4-Amino-2,5-dimethoxy-3',5'-dichloro-4'-p-chlorobenzoylamino-azobenzene | reddish-tinged yellow |
| 20 | 4-Amino-2-acetylamino-3',5'-dichloro-4'-p-chlorobenzoylamino-azobenzene | yellow |

EXAMPLE 21

2 g of the pigment manufactured according to Example 3 are ground with 36 g of hydrated alumina, 60 g of medium viscosity linseed oil varnish and 2 g of cobalt linoleate on a triple roll mill. The orange prints produced with the resulting coloured paste are of deep colour and outstanding fastness to light.

EXAMPLE 22

0.6 g of the pigment manufactured according to Example 1 are mixed with 67 g of polyvinyl chloride, 33 g of dioctyl phthalate, 2 g of dibutyl-tin dilaurate and 2 g of titanium dioxide and the mixure is worked on a roll mill for 15 minutes at 160° C to give a thin sheet. The yellow colouration thus produced is deeply coloured and fast to migration, heat and light.

EXAMPLE 23

10 g of titanium dioxide and 2 g of the pigment manufactured according to Example 3 are ground in a ball mill with 88 g of a mixture of 26.4 g of coconut alkyd resin, 24.0 g of melamine-formaldehyde resin (50% solids content), 8.8 g of ethylene glycol monomethyl ether and 28.8 g of xylene for 48 hours.

If this lacquer is sprayed onto aluminum foil, pre-dried for 30 minutes at room temperature and then stoved for 30 minutes at 120° C, an orange lacquering is obtained, which is distinguished by good depth of colour coupled with very good fastness to overlacquering, light and weathering.

I claim:
1. An iminoisoindolinone dyestuff of the formula

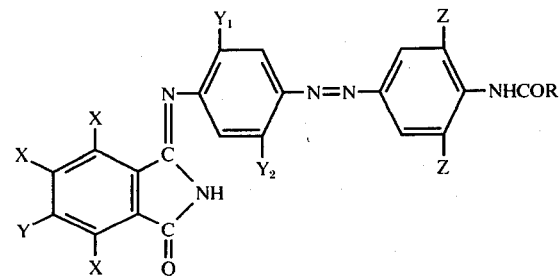

wherein X is chloro or bromo, Y is chloro, bromo or methoxy, $Y_1$ is hydrogen, chloro, alkyl containing 1–4 carbon atoms or alkoxy containing 1–4 carbon atoms, $Y_2$ is alkyl containing 1–4 carbon atoms, alkoxy containing 1–4 carbon atoms, alkanoylamino containing 1–4 carbon atoms, benzoylamino, benzoylamino substituted by chloro, alkyl containing 1–4 carbon atoms, or alkoxy containing 1–4 carbon atoms, Z is chloro or methyl, and R is alkyl containing 1–4 carbon atoms, phenyl, or phenyl substituted by chloro, alkyl containing 1–4 carbon atoms, or alkoxy containing 1–4 carbon atoms, or alkoxycontaining 1–4 carbon atoms.

2. Iminoisoindolinone dyestuff according to claim 1, wherein X is chlorine.

* * * * *